United States Patent
Ye (10) Patent No.: US 11,126,315 B2
(45) Date of Patent: Sep. 21, 2021

(54) TOUCH ELECTRODE LAYER AND TOUCH DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventor: Jian Ye, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 16/639,753

(22) PCT Filed: Dec. 23, 2019

(86) PCT No.: PCT/CN2019/127372
§ 371 (c)(1),
(2) Date: Feb. 18, 2020

(87) PCT Pub. No.: WO2021/056878
PCT Pub. Date: Apr. 1, 2021

(65) Prior Publication Data
US 2021/0096693 A1 Apr. 1, 2021

(51) Int. Cl.
*G06F 3/041* (2006.01)
*G06F 3/044* (2006.01)

(52) U.S. Cl.
CPC ......... *G06F 3/0446* (2019.05); *G06F 3/0412* (2013.01); *G06F 3/0445* (2019.05);
(Continued)

(58) Field of Classification Search
CPC .... G06F 3/0412; G06F 3/0446; G06F 3/0443; G06F 3/0445; G06F 2203/04112;
(Continued)

(56) References Cited

U.S. PATENT DOCUMENTS

| | | | |
|---|---|---|---|
| 2009/0002337 A1* | 1/2009 | Chang | G06F 3/0446 345/174 |
| 2011/0018838 A1* | 1/2011 | Lee | G06F 3/0446 345/174 |

(Continued)

FOREIGN PATENT DOCUMENTS

| | | |
|---|---|---|
| CN | 103970354 A | 8/2014 |
| CN | 104364742 A | 2/2015 |

(Continued)

*Primary Examiner* — Hong Zhou
(74) *Attorney, Agent, or Firm* — Mark M. Friedman (57) ABSTRACT

A touch electrode layer and a touch display device are provided. By setting first and second electrodes of a touch electrode unit to a trunk and a branch structure, respectively. First electrode branches are electrically connected to first electrode trunks. Second electrode branches are electrically connected to second electrode trunks. The first electrode branches and the second electrode branches form "a homocentric squares pattern" of a limit coupling shape, which can increase rate of change of a basic mutual capacitance value when a finger touches it. In addition, third electrodes having "a homocentric squares pattern" are disposed between the first branch electrodes having a homocentric squares pattern and the second branch electrodes having a homocentric squares pattern and are not connected to the first branch electrodes and the second branch electrodes. This effectively reduces a basic mutual capacitance value Cm and can effectively reduce parasitic capacitance to ground.

17 Claims, 10 Drawing Sheets

(52) U.S. Cl.
CPC ............. *G06F 2203/04102* (2013.01); *G06F 2203/04111* (2013.01)

(58) Field of Classification Search
CPC ........... G06F 2203/04111; G06F 3/044; G06F 2203/04102
See application file for complete search history.

(56) References Cited

U.S. PATENT DOCUMENTS

| | | |
|---|---|---|
| 2013/0127781 A1 | 5/2013 | Hotelling et al. |
| 2013/0278542 A1 | 10/2013 | Stephanou et al. |
| 2014/0028625 A1* | 1/2014 | Maeda ................. G06F 3/0443 345/174 |
| 2016/0117016 A1* | 4/2016 | Wu ...................... G06F 3/0446 345/174 |
| 2016/0253036 A1 | 9/2016 | Yang et al. |
| 2018/0224964 A1* | 8/2018 | Church .................. G06F 3/047 |
| 2019/0064966 A1* | 2/2019 | Kim ..................... G06F 3/0445 |
| 2019/0146608 A1* | 5/2019 | Lee ...................... G06F 3/0416 345/174 |
| 2020/0379605 A1* | 12/2020 | Zhang .................. G06F 3/0446 |

FOREIGN PATENT DOCUMENTS

| | | |
|---|---|---|
| CN | 104407755 A | 3/2015 |
| CN | 106066733 A | 11/2016 |
| CN | 106339142 A | 1/2017 |
| CN | 108415629 A | 8/2018 |

\* cited by examiner

TOUCH ELECTRODE LAYER AND TOUCH DISPLAY DEVICE

This application claims the priority of Chinese Application No. 201910914554.5 filed on Sep. 26, 2019 and titled "TOUCH ELECTRODE LAYER AND TOUCH DISPLAY DEVICE", which is incorporated herein by reference in its entirety.

FIELD OF INVENTION

The present disclosure relates to the field of display technologies, and more particularly to a touch electrode layer and a touch display device.

BACKGROUND OF INVENTION

At present, flexible folding smartphones generally use flexible active-matrix organic light-emitting diodes (AMO-LEDs) with flexible touch screens. Grid metal on-cell (integration of touch panel and liquid crystal panel) touch technology is a current key technology development direction.

Technical Problem

Foldable touch displays determine that protective covers cannot use thicker rigid glass covers similar to traditional mobile phones. Thin transparent flexible films must be used as the protective covers, such as transparent films. At present, for floating touch under thin covers, thinning of covers make an amount of finger induction larger, and signals AC when floating and not floating are large. Multi-finger touches will be coupled to each other and cause unreported points or ghost points. When the mobile phones are in a floating state, when multi-finger touches, it is easy to cause attenuation of remaining finger signal amount, so that the multi-finger touch cannot be recognized.

Therefore, there is an urgent need to provide a new touch electrode layer and a touch display device to reduce issues such as attenuation of a signal amount of a finger, thereby improving reliability of the touch display device.

SUMMARY OF INVENTION

An object of the present invention is to provide a touch electrode layer and a touch display device. It can effectively improve a mutual capacitance value between touch driving electrodes and touch sensing electrodes, and further make mutual capacitance electric field distribution in an entire touch screen structure more uniform, which is more conducive to improving resolution and accuracy of detecting a touch position.

An object of the present invention is to provide a touch electrode layer and a touch display device. By setting first electrodes and second electrodes of a touch electrode unit to a trunk and a branch structure, respectively, first electrode branches are electrically connected to first electrode trunks, second electrode branches are electrically connected to second electrode trunks, and the first electrode branches and the second electrode branches form "a homocentric squares pattern" of a limit coupling shape, which can increase rate of change of a basic mutual capacitance value when a finger touches it.

In order to achieve the above object, an embodiment of the present invention provides a touch electrode layer, comprising a plurality of first electrode chains disposed along a first direction, each of the first electrode chains comprising a plurality of first electrodes electrically connected to each other; a plurality of second electrode chains disposed along a second direction, each of the second electrode chains comprising a plurality of second electrodes electrically connected to each other, each of the first electrode chains and each of the second electrode chains being insulated from each other; wherein each of the first electrodes and each of the second electrodes corresponding to each of the first electrodes form a touch electrode unit, each of the first electrodes comprises a plurality of first electrode branches, each of the second electrodes comprises a plurality of second electrode branches, and each of the first electrode branches and each of the second electrode branches are insulated from each other and are staggered.

In an embodiment of the present invention, the touch electrode layer further comprises third electrodes insulated from the first electrodes and the second electrodes and are disposed between the first electrode branches and the second electrode branches.

In an embodiment of the present invention, in the touch electrode unit, the first electrodes further comprise first electrode trunks disposed along the first direction, the second electrodes further comprise second electrode trunks disposed along the second direction, the first electrode trunks and the second electrode trunks intersect in an intersection region, and in the intersection region, the first electrode trunks and the second electrode trunks are insulated from each other.

In an embodiment of the present invention, the first electrode trunks comprise upper electrode trunks, lower electrode trunks, and first connection parts, and the first connection parts connect the upper electrode trunks and the lower electrode trunks and correspond to the intersection region; the second electrode trunks comprise left electrode trunks, right electrode trunks, and second connection parts, and the second connection parts connect the left electrode trunks and the right electrode trunks and correspond to the intersection region.

In an embodiment of the present invention, the touch electrode layer further comprises a buffer layer; an insulating layer disposed on the buffer layer; a first metal layer disposed in the insulating layer, wherein the first electrode chains are formed in the first metal layer; and a second metal layer disposed on the insulating layer, wherein the second electrode chains are formed in the second metal layer.

In an embodiment of the present invention, the touch electrode layer further comprises a buffer layer; an insulating layer disposed on the buffer layer, wherein the insulating layer has a connection bridge and corresponds to the intersection region; a first metal layer disposed on the insulating layer, wherein the first electrode chains are formed in the first metal layer; and a second metal layer disposed on the insulating layer, wherein the second metal layer is disposed on a same layer as the first metal layer, the second electrode chains are formed in the second metal layer, in the intersection region, the connection part is the connection bridge, and the upper electrode trunks and the lower electrode trunks are electrically connected through the connection bridge.

In an embodiment of the present invention, the first electrodes, the second electrodes, and the third electrodes are formed of metal grid lines; shapes of the first electrode branches, the second electrode branches, and the third electrodes are L-shaped.

In an embodiment of the present invention, the first electrode trunks and the second electrode trunks divide the touch electrode unit into a first region, a second region, a third region, and a fourth region, and the first region, the second region, the third region, and the fourth region are respectively provided with a same number of the first electrode branches; the first electrode branches are connected to the first electrode trunks, and the first region, the second region, the third region, and the fourth region are respectively provided with a same number of the first electrode branches; the second electrode branches are connected to the second electrode trunks, and the first region, the second region, the third region, and the fourth region are respectively provided with a same number of the second electrode branches.

In an embodiment of the present invention, the left electrode trunks are disposed between the first region and the third region, the second electrode branches located in the first region and the third region are connected to the left electrode trunks, the right electrode trunks are disposed between the second region and the fourth region, and the second electrode branches located in the second region and the fourth region are connected to the right electrode trunks; the second electrode branches of the first region are not connected to the second electrode branches of the second region, and the second electrode branches of the third region are not connected to the second electrode branches of the fourth region.

In an embodiment of the present invention, the left electrode trunks are disposed between the first region and the third region, the second electrode branches located in the first region and the third region are connected to the left electrode trunks, the right electrode trunks are disposed between the second region and the fourth region, and the second electrode branches located in the second region and the fourth region are connected to the right electrode trunks; the second electrode branches of the first region are not connected to the second electrode branches of the second region, and the second electrode branches of the third region are not connected to the second electrode branches of the fourth region.

In an embodiment of the present invention, the third electrodes have a plurality of first metal lines, which are respectively disposed in the first region, the second region, the third region, and the fourth region; the first metal lines located in the first region, the second region, the third region, and the fourth region are not connected to each other, and each of the first metal lines is disposed between an adjacent one of the first trunk electrode branches and an adjacent of the second trunk electrodes.

In an embodiment of the present invention, the first electrode branches of the first region, the second region, the third region, and the fourth region form a homocentric squares pattern in the touch electrode unit; the second electrode branches of the first region, the second region, the third region, and the fourth region form a homocentric squares pattern in the touch electrode unit; the third electrodes of the first region, the second region, the third region, and the fourth region form a homocentric squares pattern in the touch electrode unit.

In an embodiment of the present invention, the first electrode branches have at least one electrode protrusion, and the at least one electrode protrusion is perpendicular to the first electrode branches.

An embodiment of the present invention further provides a touch display device, comprising a substrate; a thin film transistor layer disposed on the substrate; a display layer disposed on the thin film transistor layer; and a touch electrode layer disposed on the display layer, wherein the touch electrode layer is connected to an integrated chip through a wire; the touch electrode layer comprising a plurality of first electrode chains disposed along a first direction, each of the first electrode chains comprising a plurality of first electrodes electrically connected to each other; a plurality of second electrode chains disposed along a second direction, each of the second electrode chains comprising a plurality of second electrodes electrically connected to each other, each of the first electrode chains and each of the second electrode chains being insulated from each other; wherein each of the first electrodes and each of the second electrodes corresponding to each of the first electrodes form a touch electrode unit, each of the first electrodes comprises a plurality of first electrode branches, each of the second electrodes comprises a plurality of second electrode branches, and each of the first electrode branches and each of the second electrode branches are insulated from each other and are staggered.

In an embodiment of the present invention, the touch display device further comprises a thin film encapsulation layer disposed between the display layer and the touch electrode layer.

Beneficial Effect

Embodiments of the present invention provide a touch electrode layer and a touch display device. By setting first electrodes and second electrodes of a touch electrode unit to a trunk and a branch structure, respectively. First electrode branches are electrically connected to first electrode trunks. Second electrode branches are electrically connected to second electrode trunks. The first electrode branches and the second electrode branches form "a homocentric squares pattern" of a limit coupling shape, which can increase rate of change of a basic mutual capacitance value when a finger touches it. In addition, third electrodes having "a homocentric squares pattern" are disposed between the first branch electrodes having a homocentric squares pattern and the second branch electrodes having a homocentric squares pattern and are not connected to the first branch electrodes and the second branch electrodes. This effectively reduces a basic mutual capacitance value Cm and can effectively reduce a parasitic capacitance to ground.

DESCRIPTION OF DRAWINGS

In order to explain technical solutions in embodiments more clearly, the accompanying drawings used in the description of the embodiments will be briefly introduced below. Obviously, the drawings in the following description are only some embodiments of the present invention. For those of ordinary skill in the art, other drawings can be obtained according to these drawings without paying creative efforts.

Touch electrode unit 100, 100a; first electrode 101; second electrode 102;

First electrode trunk 1011; first electrode branch 1012, 1012a; second electrode trunk 1021;

Second electrode branch 1022; first region 110; second region 120;

Third region 130; fourth region 140; intersection region 150;

Upper electrode trunk 1011a; lower electrode trunk 1011b; first connection part 104;

Third electrode 103; first metal wire 1031; left electrode trunk 1021a;

Right electrode trunk 1021b; second connection part 105; electrode protrusion 1013a;

Touch electrode layer 200; buffer layer 201; insulating layer 202;

Touch display device 300; organic light-emitting diode (OLED) display panel 310; polarizer 305;

Glass cover plate 306; substrate 301; thin film transistor layer 302;

Display layer 303; encapsulation layer 304.

DETAILED DESCRIPTION OF PREFERRED EMBODIMENTS

The following is a description of each embodiment with reference to attached drawings to illustrate specific embodiments in which the present invention can be implemented.

Embodiments of the present invention will be described in detail herein with reference to the accompanying drawings. The present invention may take many different forms. The present invention should not be interpreted merely as the specific embodiments set forth herein. The embodiments of the present invention are provided to explain the practical application of the present invention, so that those skilled in the art can understand various embodiments of the present invention and various modifications suitable for a specific intended application.

Figure 1:
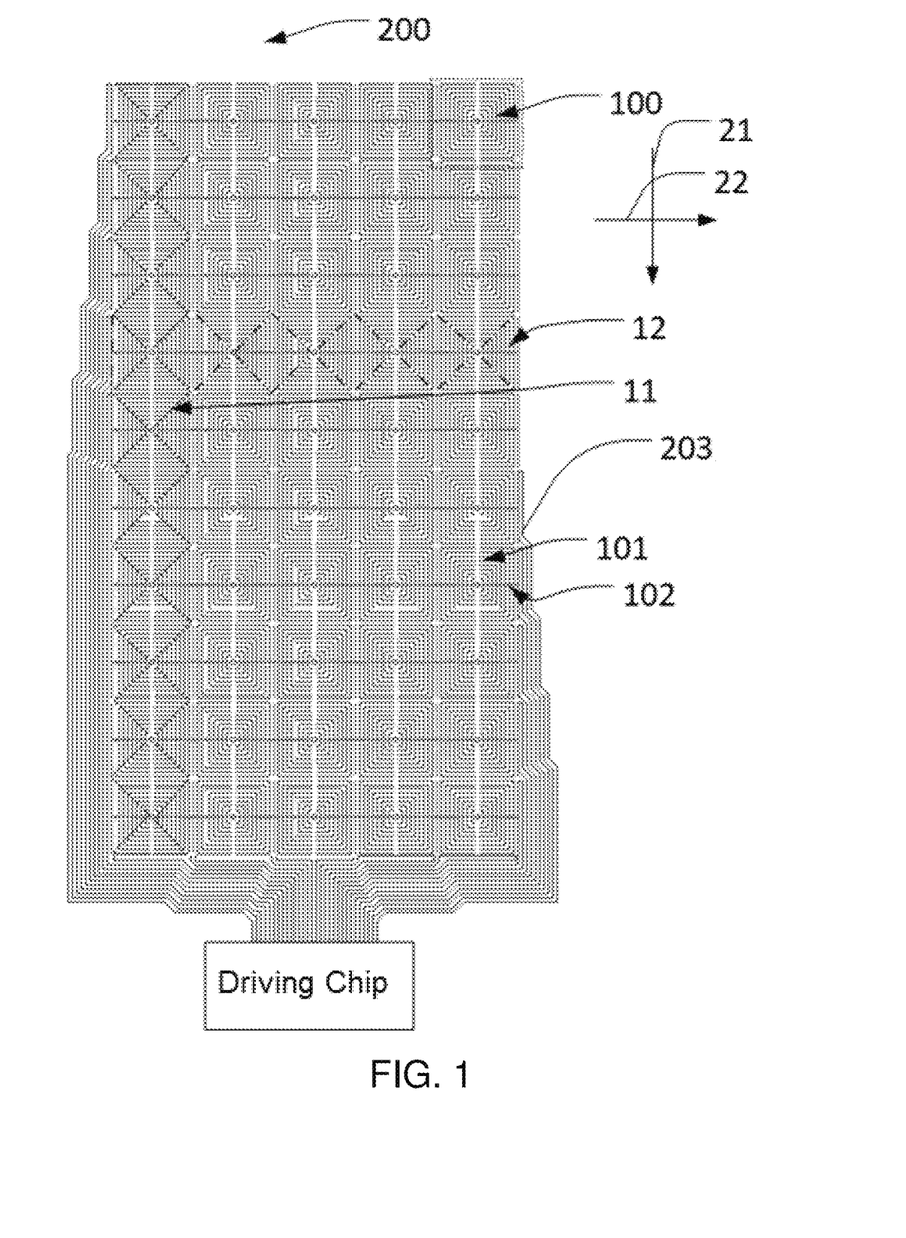
FIG. 1 is a schematic plan view of a touch electrode layer according to an embodiment of the present invention.

As shown in FIG. 1, the present invention provides a touch electrode layer 200. In one embodiment, the touch electrode layer 200 includes a plurality of first electrode chains 11 disposed along a first direction 21, wherein each of the first electrode chains includes a plurality of first electrodes 101 electrically connected to each other; a plurality of second electrode chains 12 disposed along a second direction 22, wherein each of the second electrode chains 12 includes a plurality of second electrodes 102 electrically connected to each other, wherein each of the first electrode chains 11 and each of the second electrode chains 12 are insulated from each other. The first direction 21 is perpendicular to the second direction 22. The first electrode chains 11 are labeled with a vertical dotted diamond frame marked in FIG. 1, and the second electrode chains 12 are labeled with a horizontal dotted diamond frame marked in FIG. 2.

Each of the first electrodes 101 and each of the second electrode 102 corresponding to each of the first electrodes 101 form a touch electrode unit 100.

Figure 2:
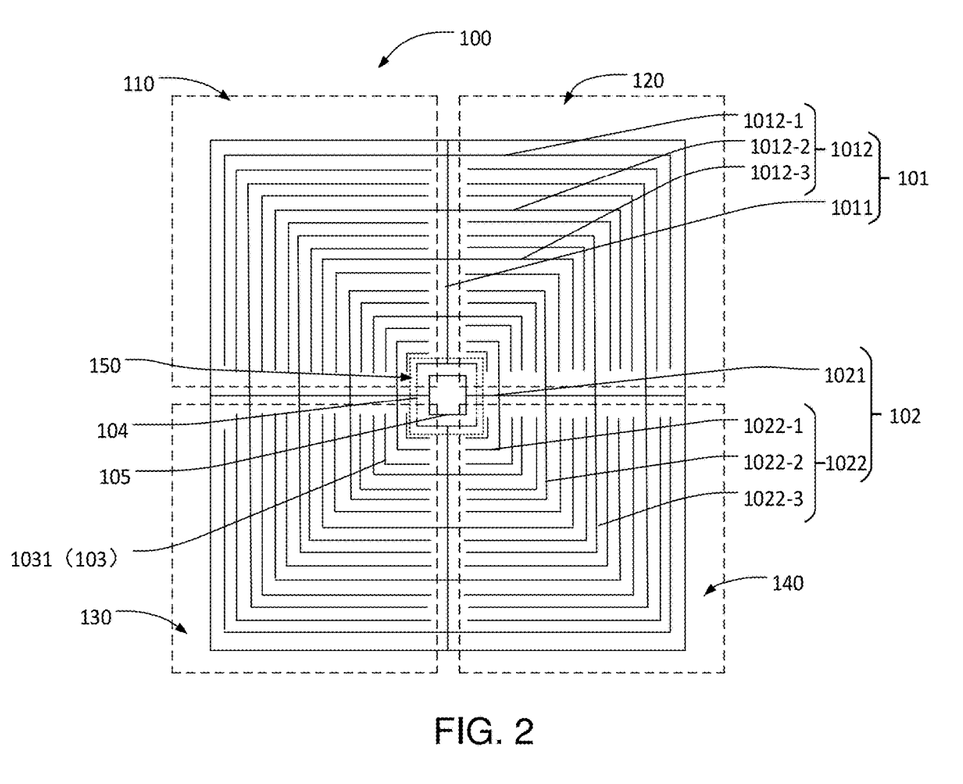
FIG. 2 is a schematic plan view of a touch electrode unit according to an embodiment of the present invention.

Referring to FIG. 2, each of the first electrode 101 has a first electrode trunk 1011 and a plurality of first electrode branches 1012, and each of the second electrodes 102 has a second electrode trunk 1021 and a plurality of second electrode branches 1022. Each of the first electrode branches 1012 and each of the second electrode branches 1012 are insulated and staggered from each other.

The first electrode 101 is a driving electrode, and the second electrode 102 is a sensing electrode.

The first electrode trunk 1011 is vertically disposed in a middle of the touch electrode unit 100. The second electrode trunk 1021 is horizontally disposed in a middle of the touch electrode unit 100. The first electrode trunk 1011 and the second electrode trunk 1021 divide the touch electrode unit 100 into a first region 110, a second region 120, a third region 130, and a fourth region 140. The second electrode trunk 1021 is perpendicular to the first electrode trunk 1011. The second electrode trunk 1021 and the first electrode trunk 1011 are not connected to each other and form an intersection region 150 at a center.

Each first electrode branch 1012 is connected to the first electrode trunk 1011. In other words, each first electrode branch 1012 and the first electrode trunk 1011 are connected to each other. The same number of the first electrode branches 1012 are provided in the first region 110, the second region 120, the third region 130, and the fourth region 140, respectively. For example, in FIG. 2, three first electrode branches 1012-1, 1012-2, and 1012-3 are marked with guide lines. Of course, in this embodiment, the number of the first electrode branches 1012 is more than three.

Each second electrode branch 1022 is connected to the second electrode trunk 1021. In other words, each second electrode branch 1022 and the second electrode trunk 1021 are connected to each other. The first electrode 110, the second electrode 120, the third electrode 130, and the fourth electrode 140 are respectively provided with the same number of the second electrode branches 1022. For example, the three second electrode branches 1022-1, 1022-2, and 1022-3 are marked with guide lines in FIG. 1. Of course, in this embodiment, the number of the second electrode branches 1022 is more than three.

In the first region 110, the second region 120, the third region 130, and the fourth region 140, the second electrode branches 1022 and the first electrode branches 1012 are staggered and have the same interval between each other, and a third electrode 103 is provided between every two adjacent second electrode branches 1022 and the first electrode branch 1012, and the third electrode 103 and the first electrode 101 are disposed on the same layer.

Referring to FIG. 1 and FIG. 2, the first electrode trunk 1011 includes an upper electrode trunk 1011a, a lower electrode trunk 1011b, and a first connection part 104. The first connection part 104 connects the upper electrode trunk 1011a and the lower electrode trunk 1011b.

Figure 3:
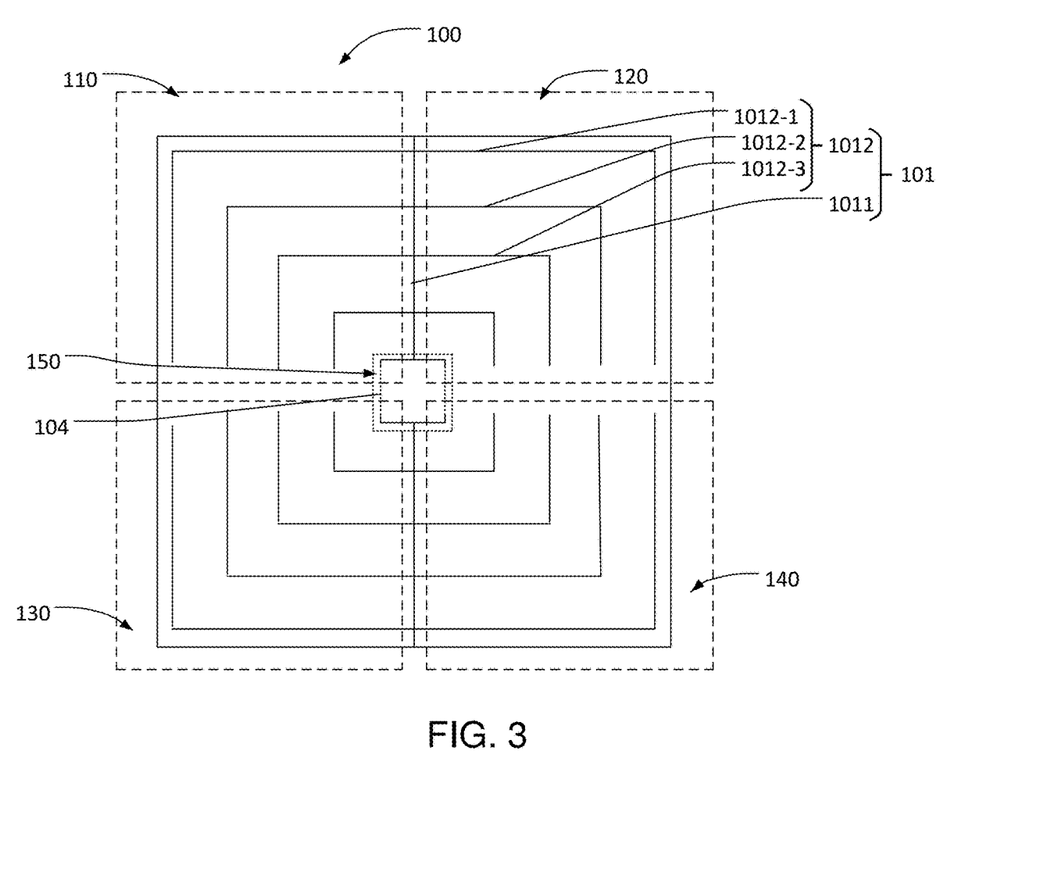
FIG. 3 is a schematic plan view of first electrodes of a touch electrode unit according to an embodiment of the present invention.

Referring also to FIG. 3, the upper electrode trunk 1011a is disposed between the first region 110 and the second region 120. The first electrode branches 1012 of the first region 110 and the second region 120 are connected to the upper electrode trunk 1011a. The lower electrode trunk 1011b is disposed between the third region 130 and the fourth region 140. The first electrode branches 1012 of the third region 130 and the fourth region 140 are connected to the lower electrode trunk 1011b.

The first electrode branch 1012 of the first region 110 is not connected to the first electrode branch 1012 of the third region 130, and the first electrode branch 1012 of the second region 120 is not connected to the first electrode branch 1012 of the fourth region 140.

Figure 4:
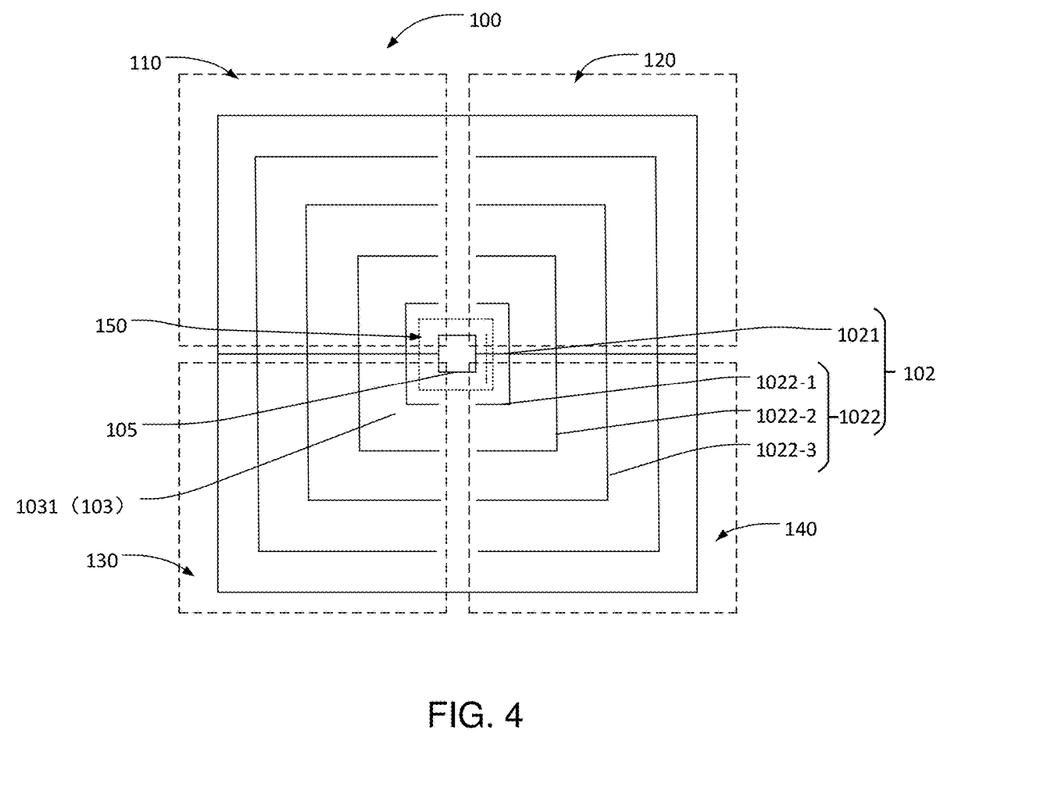
FIG. 4 is a schematic plan view of second electrodes of a touch electrode unit according to an embodiment of the present invention.

Referring to FIG. 2 and FIG. 4, the second electrode trunk 1021 includes a left electrode trunk 1021a, a right electrode trunk 1021b, and a second connection part 105. The second connection part 105 connects the left electrode trunk 1021a and the right electrode trunk 1021b.

In an intersection region 150, the second connection part 105 is disposed above the first connection part 104. In FIG. 2, a mark of the first connection part 104 is indicated by a dotted line.

The left electrode trunk 1021a is disposed between the first region 110 and the third region 130. The second electrode branches 1022 of the first region 110 and the third region 130 are connected to the left electrode trunk 1021a. The right electrode trunk 1021b is disposed between the second region 120 and the fourth region 140. The second electrode branches 1022 of the second region 120 and the fourth region 140 are connected to the right electrode trunk 1021b.

The second electrode branch 1022 of the first region 110 is not connected to the second electrode branch 1022 of the second region 120. The second electrode branch 1022 of the third region 130 is not connected to the second electrode branch 1022 of the fourth region 140.

Figure 5:
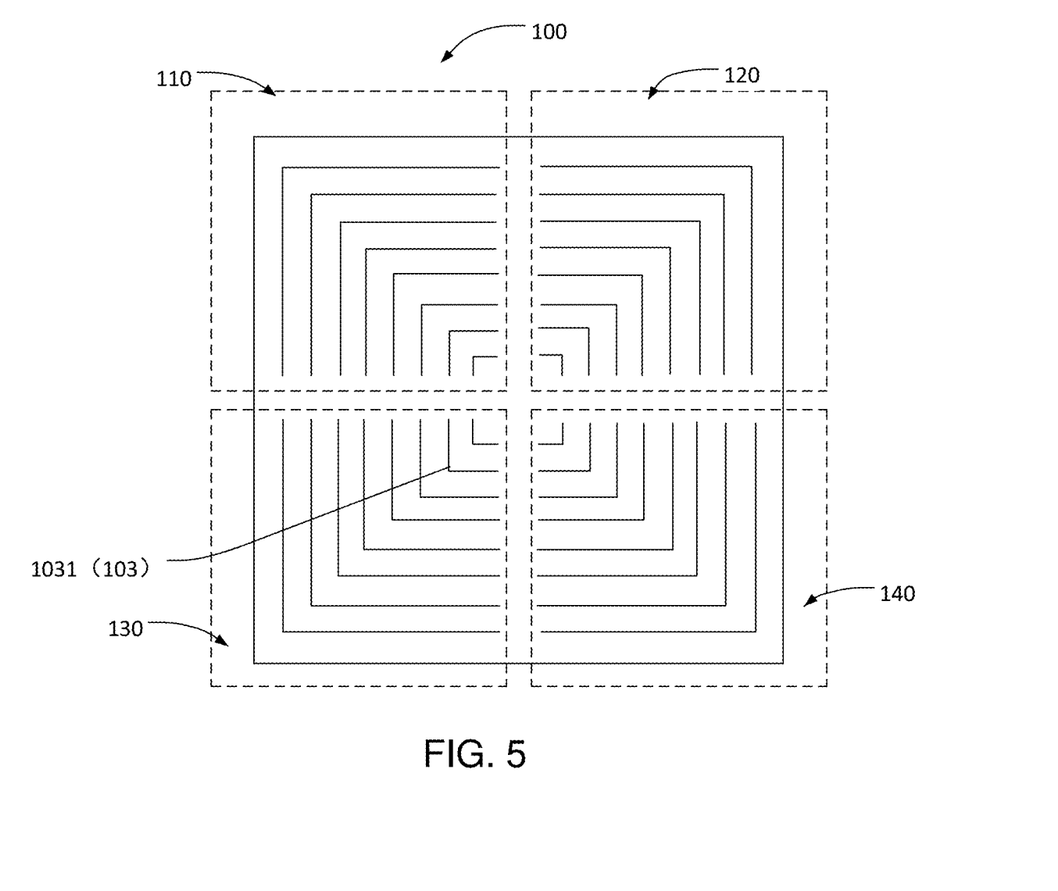
FIG. 5 is a schematic plan view of third electrodes of a touch electrode unit according to an embodiment of the present invention.

Referring to FIG. 2 and FIG. 5, the third electrode 103 has a plurality of first metal lines 1031, which are respectively disposed in the first region 110, the second region 120, the third region 130, and the fourth region 140.

The first metal lines 1031 of the first region 110, the second region 120, the third region 130, and the fourth region 140 are not connected to each other. Each of the first metal wires 1031 is disposed between the adjacent branches of the first trunk electrode and the second trunk electrode. That is, a first metal wire 1031 is provided between every two adjacent branches of the first trunk electrode and the second trunk electrode.

Shapes of the first electrode branch 1012, the second electrode branch 1022, and the third electrode 103 are L-shaped. A right angle of each of the L-shaped electrode branches is toward the intersection region 150. Two ends of each of the L-shaped electrode branches are perpendicular to the first electrode trunk 1011 and the second electrode trunk 1021, respectively.

As shown in FIG. 3, therefore, it can be known from the drawings that the first electrode branches 1012 of the first region 110, the second region 120, the third region 130, and the fourth region 140 form "a homocentric squares pattern" in the touch electrode unit 100. Here, the first electrode branch 1012 in a complete "homocentric squares pattern" is not formed, because the first electrode branch 1012 of the entire touch electrode unit 100 is interrupted by the second electrode trunk 1021.

As shown in FIG. 4, the second electrode branches 1022 of the first region 110, the second region 120, the third region 130, and the fourth region 140 form "a homocentric squares pattern" in the touch electrode unit 100. Here, the second electrode branch 1022 of a complete "homocentric squares pattern" is not formed, because the second electrode branch 1022 of the entire touch electrode unit 100 is interrupted by the first electrode trunk 1011.

As shown in FIG. 5, the third electrodes 103 of the first region 110, the second region 120, the third region 130, and the fourth region 140 form "a homocentric squares pattern" in the touch electrode unit 100. The third electrode 103 of a complete "homocentric squares pattern" is not formed here, because the third electrode 103 of the entire touch electrode unit 100 is interrupted by the first electrode trunk 1011 and the second electrode trunk 1021.

Figure 6:
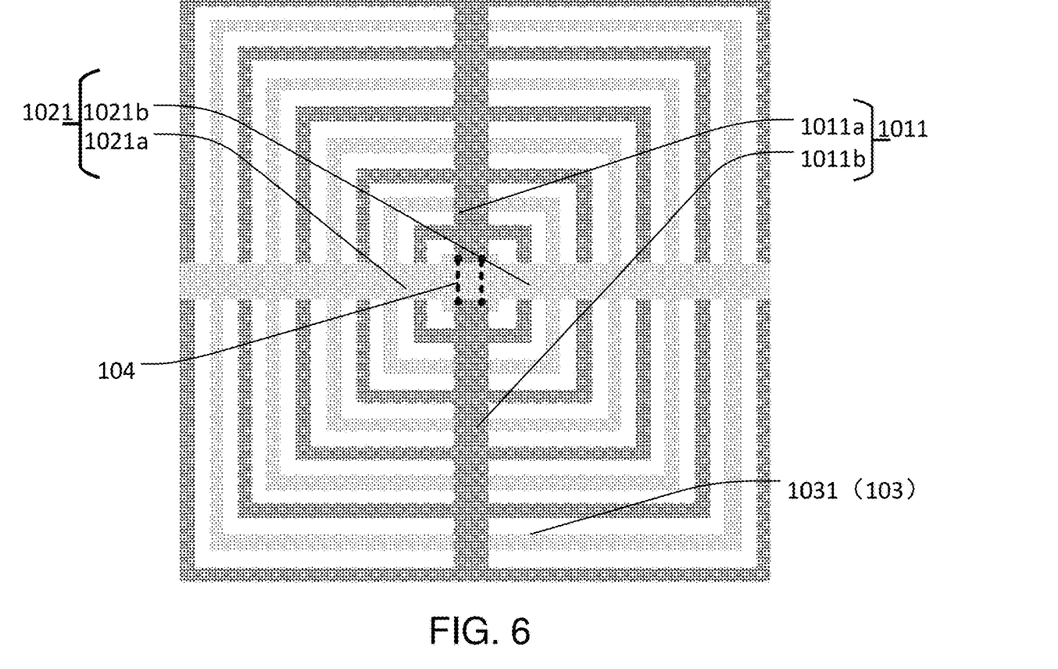
FIG. 6 is a schematic view of metal grids of a touch electrode unit according to an embodiment of the present invention.

As shown in FIG. 6, the first electrode 101, the second electrode 102, and the third electrode 103 are all metal mesh structures. The white area in FIG. 2 is the third electrode 103. Since three types of electrodes need to be distinguished when drawing, the third electrode 103 does not draw a grid structure.

Figure 7:
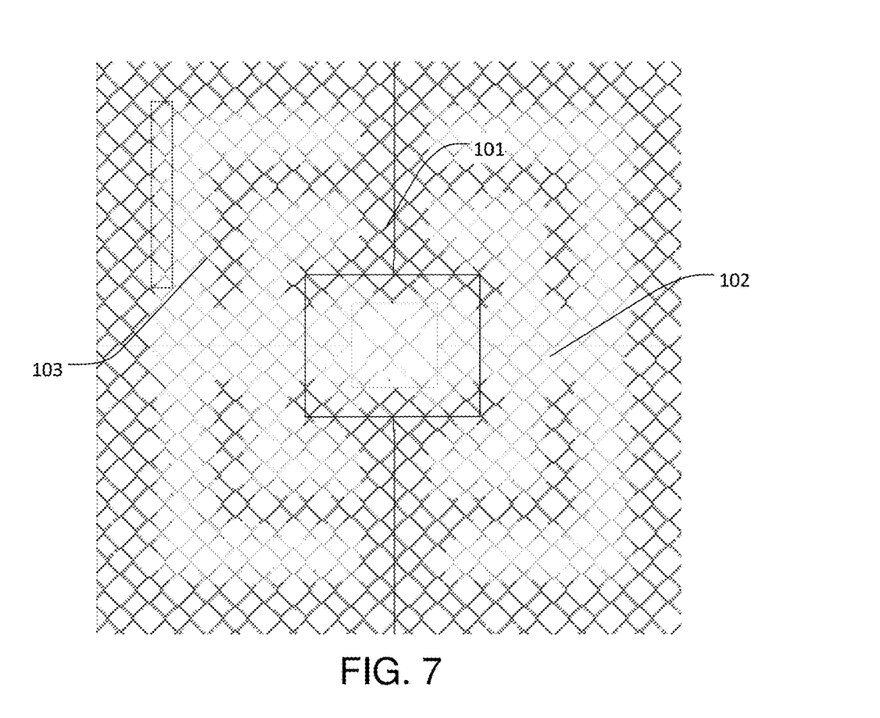
FIG. 7 is a schematic view of metal grids of a touch electrode unit according to another embodiment the present invention.

As shown in FIG. 7, in order to better define the features of the present invention, the metal grid structure of the part of the present invention is described as a linear structure of FIG. 2 to FIG. 5. The wiring of the metal grid structure corresponds to a gap of sub-pixels, and an opening of the sub-pixels is improved.

From FIG. 7, it can be clearly seen that the first electrode 101, the second electrode 102, and the third electrode 103 of an embodiment of the present invention have a metal grid shape. The third electrode 103 is disposed between the adjacent first electrode branch 1012 and the second electrode branch 1022. As can be seen from the dotted box in the figure, the third electrode 103 is not connected to the first electrode 101 and the second electrode 102 and is insulated between the first electrode branch 1012 and the second electrode branch 1022.

Figure 8:
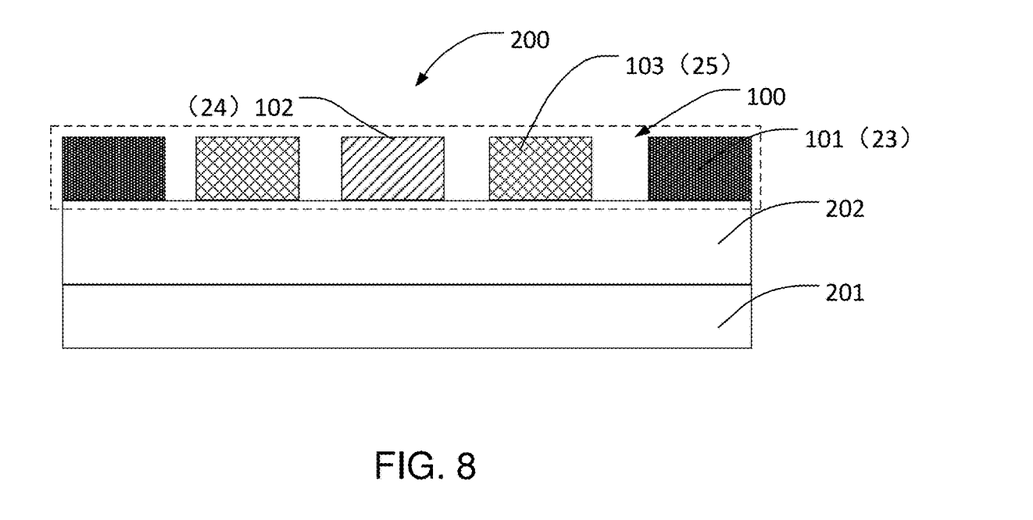
FIG. 8 is a schematic structural view of a touch electrode layer according to an embodiment of the present invention.

As shown in FIG. 8, a cross-sectional structure of the touch electrode layer 200 includes: a buffer layer 201, an insulating layer 202, a first metal layer 23, a second metal layer 24, and a third metal layer 25.

The insulating layer 202 is disposed on the buffer layer 201. The first electrode chain 11 is formed in the first metal layer 23. The second electrode chain 12 is formed in the second metal layer 24. The third electrode 103 is formed in the third metal layer 25. In this embodiment, the first metal layer 23 and the second metal layer 24 are disposed on the same layer.

Figure 9:
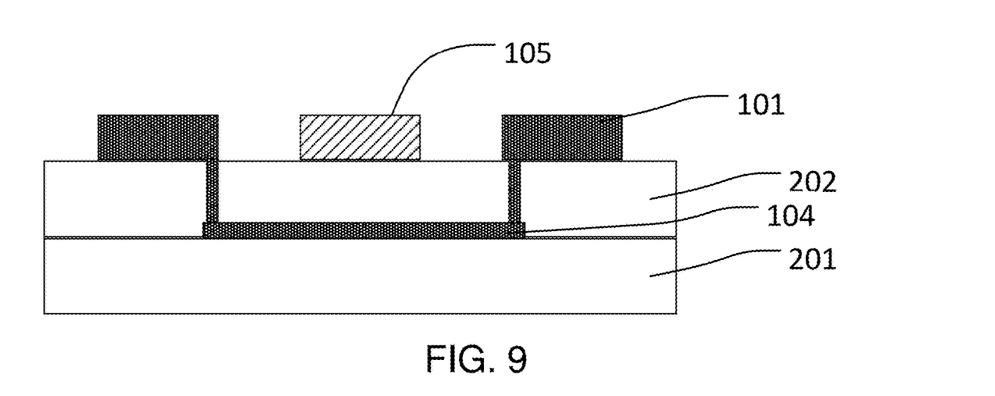
FIG. 9 is a cross-sectional view of a touch electrode layer along a first electrode trunk direction in an intersection region according to an embodiment of the present invention.

As shown in FIG. 9, in the intersection region 150, the first connection part 104 is a connection bridge, and is provided in the insulation layer 202 to connect the first electrode 101. The second connection part 105 is disposed on the same layer as the second electrode 102 (see FIG. 1 for reference numerals). The first connection part 104 and the second connection part 105 are both metal wires. The third metal layer 25 is disposed on the same layer as the first metal layer 23.

In other embodiments, the first metal layer and the second metal layer may be disposed in different layers, thereby avoiding cross-connection of the intersection region. In the intersection region, the first electrode 101 and the second electrode 102 can be directly connected without a need to provide a connection bridge. Specifically, the first metal layer is disposed in the insulating layer, and the second metal layer is disposed on the insulating layer. The third metal layer may be provided in the same layer as the first metal layer or may be provided in the same layer as the second metal layer.

In one embodiment, the present invention does not limit the number and structure of the connection bridges. It adopts the double bridge structure of scheme 1 shown in FIG. 10, and the two connection bridges are independent and are not connected with each other.

Figure 10:
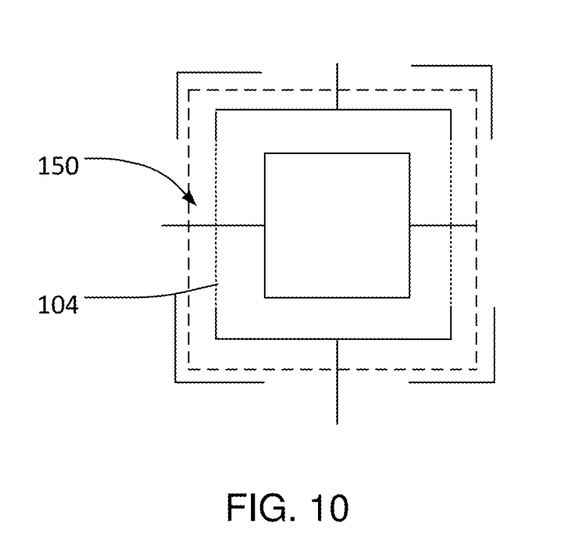
FIG. 10 is a schematic structural view of a dual-bridge connection scheme 1 according to an embodiment of the present invention.
Figure 11:
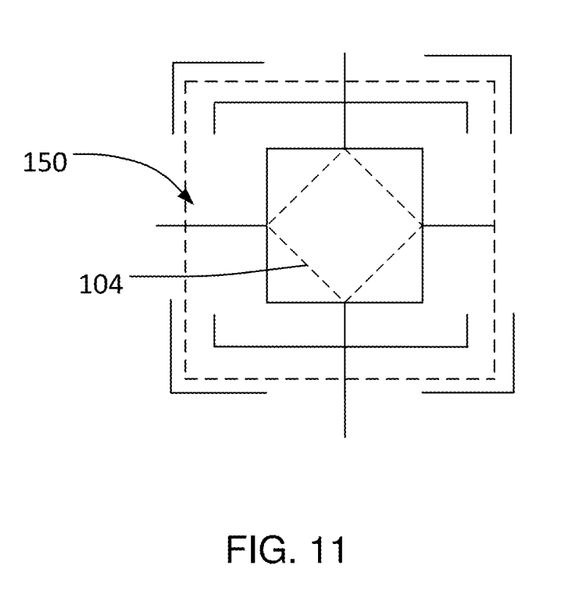
FIG. 11 is a schematic structural view of a dual bridge connection scheme 2 according to an embodiment of the present invention.

The double-bridge structure of scheme 2 shown in FIG. 11 can also be adopted. The difference between scheme 2 and scheme 1 is that the two connection bridges of scheme 2 are led out through the first electrode trunk 1011. The two connection bridges of scheme 1 are led out through a first electrode branch 1013 near the middle.

Figure 12:
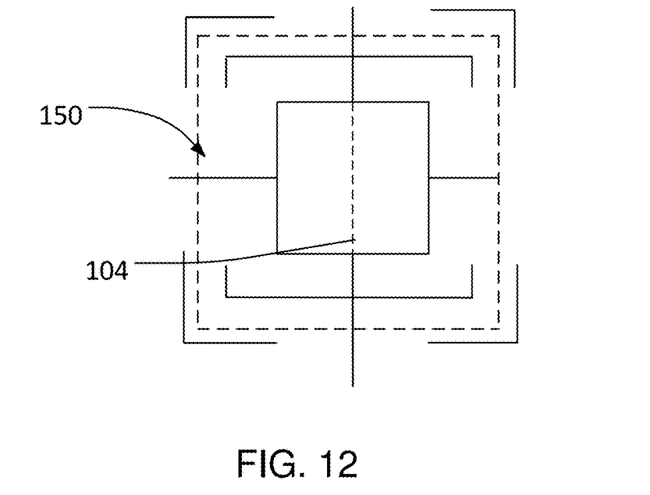
FIG. 12 is a schematic structural view of a single bridge connection according to an embodiment of the present invention.

It is also possible to adopt a single-bridge structure as shown in the scheme 3 shown in FIG. 12.

An embodiment of the present invention provides a touch electrode layer 200. By setting first electrodes 101 and second electrodes 102 of a touch electrode unit to a trunk and a branch structure, respectively. First electrode branches 1012 are electrically connected to first electrode trunks 1011. Second electrode branches 1022 are electrically connected to second electrode trunks 1021. The first electrode branches 1012 and the second electrode branches 1022 form "a homocentric squares pattern" of a limit coupling shape, which can increase rate of change of a basic mutual capacitance value when a finger touches it. In addition, third electrodes 103 having "a homocentric squares pattern" are disposed between the first branch electrodes having a homocentric squares pattern and the second branch electrodes having a homocentric squares pattern and are not connected to the first branch electrodes and the second branch electrodes. This can effectively reduce a parasitic capacitance of the first electrode (TX)/the second electrode (RX) to ground, thereby effectively reducing a load of RC electrical signal.

Figure 13:
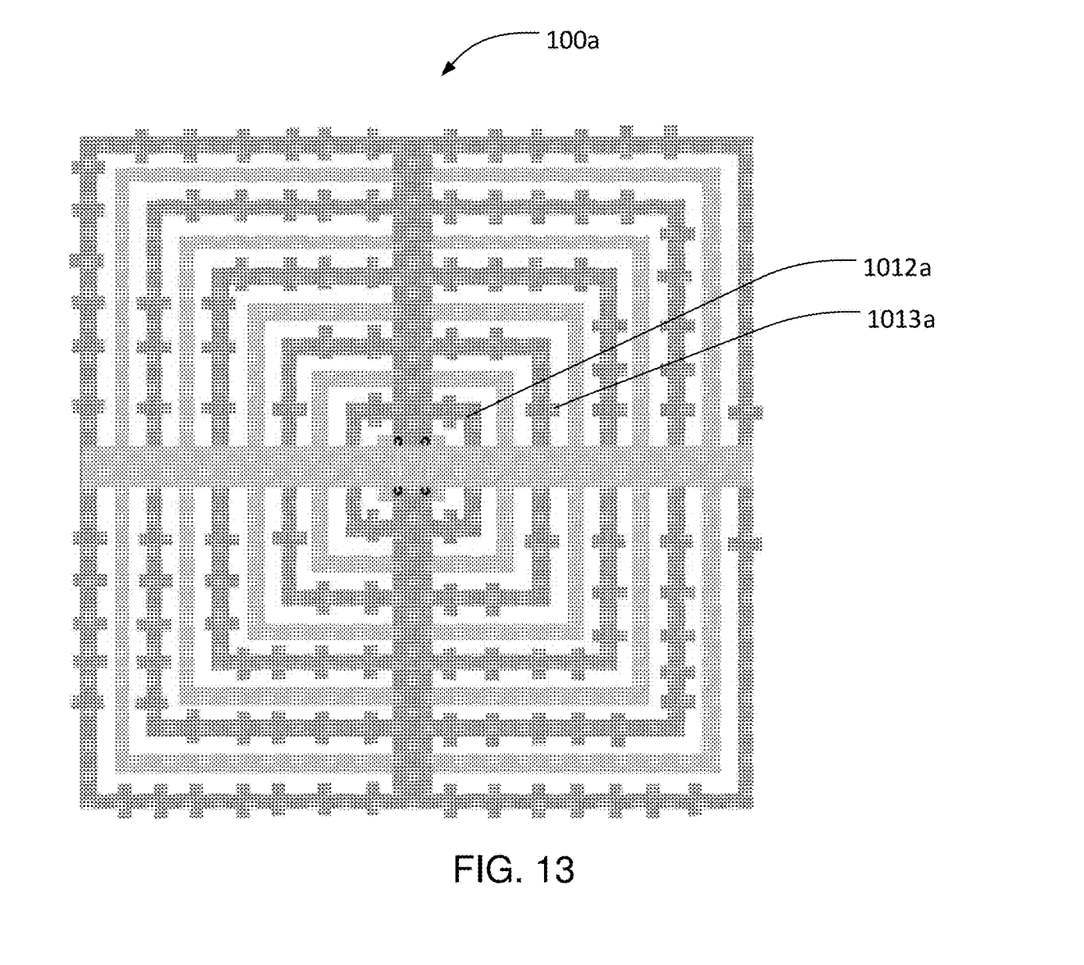
FIG. 13 is a schematic plan view of a touch electrode unit according to another embodiment of the present invention.

As shown in FIG. 13, in another embodiment, the first electrode branch 1012a of the touch electrode unit 100a of the touch electrode layer provided by the present invention has at least one electrode protrusion 1013a.

The electrode protrusion 1013a is perpendicular to the first electrode branch 1012a. The electrode protrusion 1013a can further increase TX/RX adjacent boundary coupling area to increase a mutual capacitance signal change amount ΔCm when a finger touches, thereby effectively improving touch sensitivity.

Figure 14:
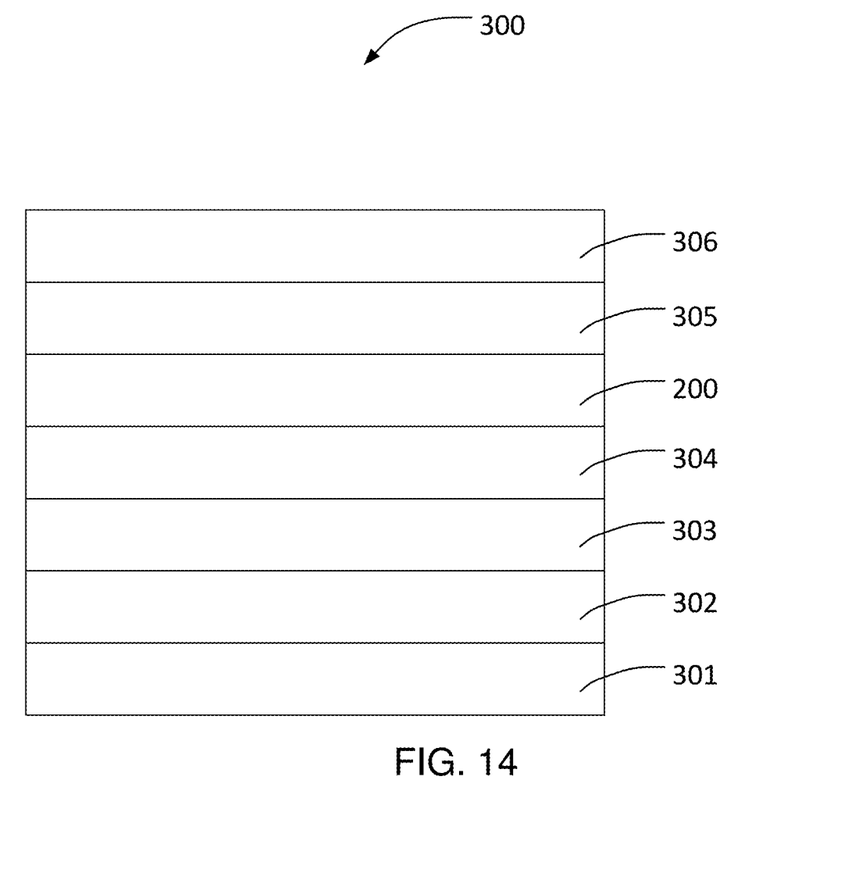
FIG. 14 is a schematic structural view of a touch display device according to an embodiment of the present invention.

As shown in FIG. 14, an embodiment of the present invention further provides a touch display device 300 including a substrate 301, a thin film transistor layer 302, a display layer 303, an encapsulation layer 304, the touch electrode layer 200, a polarizer 305, and a glass cover 306.

The thin film transistor is a low temperature polysilicon transistor. The thin film transistor layer 302 is disposed on the substrate 301. The display layer 303 is disposed on the thin film transistor layer 302, and the encapsulation layer 304 is disposed on the display layer 303.

The touch electrode layer 200 is disposed on the display layer 303, and the touch electrode layer 200 is connected to an integrated chip through a wire 203. The polarizer 305 is disposed on the touch electrode layer 200, the glass cover 306 is disposed on the polarizer 305, and the glass cover 306 and the polarizer 305 are adhered to each other by optical glue.

The glass cover 306 can be a transparent film, and the touch display device can be made into a folded display device.

The electrode grid lines of the touch electrode layer 200 avoid sub-pixels of the touch display device 300, and electrode wirings are provided between the sub-pixels.

An embodiment of the present invention provides a touch display device 300. By setting first electrodes 101 and second electrodes 102 of a touch electrode unit 100 to a trunk and a branch structure, respectively. First electrode branches 1012 are electrically connected to first electrode trunks 1011. Second electrode branches 1022 are electrically connected to second electrode trunks 1021. The first electrode branches 1012 and the second electrode branches 1022 form "a homocentric squares pattern" of a limit coupling shape, which can increase rate of change of a basic mutual capacitance value when a finger touches it. In addition, third electrodes 103 having "a homocentric squares pattern" are disposed between the first branch electrodes having a homocentric squares pattern and the second branch electrodes having a homocentric squares pattern and are not connected to the first branch electrodes and the second branch electrodes. This can effectively reduce a basic mutual capacitance value Cm, and effectively reduce a parasitic capacitance of the first electrode (TX)/second electrode (RX) to ground.

The above are only preferred embodiments of the present invention and are not intended to limit the present invention. Any modification, equivalent replacement, and improvement made within the spirit and principle of the present invention shall be included in the protection scope of the present invention.

The technical scope of the present invention is not limited to the content in the description. Those skilled in the art can make various variations and modifications to the embodiments without departing from the technical idea of the present invention. These variations and modifications should all fall within the scope of the present invention.

What is claimed is:
1. A touch electrode layer, comprising:
a plurality of first electrode chains disposed along a first direction, each of the first electrode chains comprising a plurality of first electrodes electrically connected to each other; a plurality of second electrode chains disposed along a second direction, each of the second electrode chains comprising a plurality of second electrodes electrically connected to each other, each of the first electrode chains and each of the second electrode chains being insulated from each other; and third electrodes insulated from the first electrodes and the second electrodes and are disposed between the first electrode branches and the second electrode branches;
wherein each of the first electrodes and each of the second electrodes corresponding to each of the first electrodes form a touch electrode unit, each of the first electrodes comprises a plurality of first electrode branches, each of the second electrodes comprises a plurality of second electrode branches, and each of the first electrode branches and each of the second electrode branches are insulated from each other and are staggered;
wherein the third electrodes having a homocentric squares pattern are disposed between the first branch electrodes having a homocentric squares pattern and the second branch electrodes having a homocentric squares pattern and are not connected to the first branch electrodes and the second branch electrodes; wherein the first electrodes, the second electrodes, and the third electrodes are all metal mesh structures; and wherein wirings of the metal grid structures of the first electrodes, the second electrodes, and the third electrodes correspond to a gap of sub-pixels of the touch electrode layer.

2. The touch electrode layer according to claim 1, wherein:
in the touch electrode unit, the first electrodes further comprise first electrode trunks disposed along the first direction, the second electrodes further comprise second electrode trunks disposed along the second direction, the first electrode trunks and the second electrode trunks intersect in an intersection region, and in the intersection region, the first electrode trunks and the second electrode trunks are insulated from each other.

3. The touch electrode layer according to claim 2, wherein:
the first electrode trunks comprise upper electrode trunks, lower electrode trunks, and first connection parts, and the first connection parts connect the upper electrode trunks and the lower electrode trunks and correspond to the intersection region;
the second electrode trunks comprise left electrode trunks, right electrode trunks, and second connection parts, and the second connection parts connect the left electrode trunks and the right electrode trunks and correspond to the intersection region.

4. The touch electrode layer according to claim 3, further comprising:
a buffer layer;
an insulating layer disposed on the buffer layer, wherein the insulating layer has a connection bridge and corresponds to the intersection region;
a first metal layer disposed on the insulating layer, wherein the first electrode chains are formed in the first metal layer; and
a second metal layer disposed on the insulating layer, wherein the second metal layer is disposed on a same layer as the first metal layer, the second electrode chains are formed in the second metal layer, in the intersection region, the connection part is the connection bridge, and the upper electrode trunks and the lower electrode trunks are electrically connected through the connection bridge.

5. The touch electrode layer according to claim 3, wherein:
the first electrode trunks and the second electrode trunks divide the touch electrode unit into a first region, a second region, a third region, and a fourth region, and the first region, the second region, the third region, and the fourth region are respectively provided with a same number of the first electrode branches;
the first electrode branches are connected to the first electrode trunks, and the first region, the second region, the third region, and the fourth region are respectively provided with a same number of the first electrode branches;
the second electrode branches are connected to the second electrode trunks, and the first region, the second region, the third region, and the fourth region are respectively provided with a same number of the second electrode branches.

6. The touch electrode layer according to claim 5, wherein:
the left electrode trunks are disposed between the first region and the third region, the second electrode branches located in the first region and the third region are connected to the left electrode trunks, the right electrode trunks are disposed between the second region and the fourth region, and the second electrode branches located in the second region and the fourth region are connected to the right electrode trunks;
the second electrode branches of the first region are not connected to the second electrode branches of the second region, and the second electrode branches of the third region are not connected to the second electrode branches of the fourth region.

7. The touch electrode layer according to claim 5, wherein:
the third electrodes have a plurality of first metal lines, which are respectively disposed in the first region, the second region, the third region, and the fourth region;
the first metal lines located in the first region, the second region, the third region, and the fourth region are not connected to each other, and each of the first metal lines is disposed between an adjacent one of the first trunk electrode branches and an adjacent of the second trunk electrodes.

8. The touch electrode layer according to claim 5, wherein:
the first electrode branches of the first region, the second region, the third region, and the fourth region form a homocentric squares pattern in the touch electrode unit;
the second electrode branches of the first region, the second region, the third region, and the fourth region form a homocentric squares pattern in the touch electrode unit;
the third electrodes of the first region, the second region, the third region, and the fourth region form a homocentric squares pattern in the touch electrode unit.

9. The touch electrode layer according to claim 1, further comprising:
a buffer layer;
an insulating layer disposed on the buffer layer;
a first metal layer disposed in the insulating layer, wherein the first electrode chains are formed in the first metal layer; and
a second metal layer disposed on the insulating layer, wherein the second electrode chains are formed in the second metal layer.

10. The touch electrode layer according to claim 1, wherein:
the first electrodes, the second electrodes, and the third electrodes are formed of metal grid lines;
shapes of the first electrode branches, the second electrode branches, and the third electrodes are L-shaped.

11. The touch electrode layer according to claim 1, wherein:
the first electrode branches have at least one electrode protrusion, and the at least one electrode protrusion is perpendicular to the first electrode branches.

12. A touch display device, comprising:
a substrate;
a thin film transistor layer disposed on the substrate;
a display layer disposed on the thin film transistor layer; and
a touch electrode layer disposed on the display layer, wherein the touch electrode layer is connected to an integrated chip through a wire;
the touch electrode layer comprising a plurality of first electrode chains disposed along a first direction, each of the first electrode chains comprising a plurality of first electrodes electrically connected to each other; a plurality of second electrode chains disposed along a second direction, each of the second electrode chains comprising a plurality of second electrodes electrically connected to each other, each of the first electrode chains and each of the second electrode chains being insulated from each other; and third electrodes insulated from the first electrodes and the second electrodes and are disposed between the first electrode branches and the second electrode branches;

wherein each of the first electrodes and each of the second electrodes corresponding to each of the first electrodes form a touch electrode unit, each of the first electrodes comprises a plurality of first electrode branches, each of the second electrodes comprises a plurality of second electrode branches, and each of the first electrode branches and each of the second electrode branches are insulated from each other and are staggered;

wherein the third electrodes having a homocentric squares pattern are disposed between the first branch electrodes having a homocentric squares pattern and the second branch electrodes having a homocentric squares pattern and are not connected to the first branch electrodes and the second branch electrodes; wherein the first electrodes, the second electrodes, and the third electrodes are all metal mesh structures; and wherein wirings of the metal grid structures of the first electrodes, the second electrodes, and the third electrodes correspond to a gap of sub-pixels of the touch display device.

13. The touch display device according to claim 12, wherein:

in the touch electrode unit, the first electrodes further comprise first electrode trunks disposed along the first direction, the second electrodes further comprise second electrode trunks disposed along the second direction, the first electrode trunks and the second electrode trunks intersect in an intersection region, and in the intersection region, the first electrode trunks and the second electrode trunks are insulated from each other.

14. The touch display device according to claim 13, wherein:

the first electrode trunks comprise upper electrode trunks, lower electrode trunks, and first connection parts, and the first connection parts connect the upper electrode trunks and the lower electrode trunks and correspond to the intersection region;

the second electrode trunks comprise left electrode trunks, right electrode trunks, and second connection parts, and the second connection parts connect the left electrode trunks and the right electrode trunks and correspond to the intersection region.

15. The touch display device according to claim 14, wherein the touch electrode layer further comprises:

a buffer layer;

an insulating layer disposed on the buffer layer, wherein the insulating layer has a connection bridge and corresponds to the intersection region;

a first metal layer disposed on the insulating layer, wherein the first electrode chains are formed in the first metal layer; and a second metal layer disposed on the insulating layer, wherein the second metal layer is disposed on a same layer as the first metal layer, the second electrode chains are formed in the second metal layer, in the intersection region, the connection part is the connection bridge, and the upper electrode trunks and the lower electrode trunks are electrically connected through the connection bridge.

16. The touch display device according to claim 12, wherein the touch electrode layer further comprises:

a buffer layer;

an insulating layer disposed on the buffer layer;

a first metal layer disposed in the insulating layer, wherein the first electrode chains are formed in the first metal layer; and a second metal layer disposed on the insulating layer, wherein the second electrode chains are formed in the second metal layer.

17. The touch display device according to claim 12, wherein:

the first electrodes, the second electrodes, and the third electrodes are formed of metal grid lines;

shapes of the first electrode branches, the second electrode branches, and the third electrodes are L-shaped.

* * * * *